(12) United States Patent
Spork (10) Patent No.: US 7,996,760 B2
(45) Date of Patent: Aug. 9, 2011

(54) ACQUISITION OF USER DATA OVER A NETWORK

(75) Inventor: Murray Leo Spork, Teneriffe (AU)

(73) Assignee: SAP AG, Walldorf (DE)

( * ) Notice: Subject to any disclaimer, the term of this patent is extended or adjusted under 35 U.S.C. 154(b) by 1574 days.

(21) Appl. No.: 11/014,122

(22) Filed: Dec. 15, 2004

(65) Prior Publication Data

US 2006/0129905 A1 Jun. 15, 2006

(51) Int. Cl.
*G06F 17/00* (2006.01)

(52) U.S. Cl. .......................................... 715/226

(58) Field of Classification Search .................. 715/226, 715/224, 225, 255
See application file for complete search history.

(56) References Cited

U.S. PATENT DOCUMENTS

| | | | |
|---|---|---|---|
| 6,192,380 B1 * | 2/2001 | Light et al. | 715/207 |
| 6,199,079 B1 * | 3/2001 | Gupta et al. | 715/207 |
| 6,237,031 B1 * | 5/2001 | Knauerhase et al. | 709/221 |
| 6,505,230 B1 * | 1/2003 | Mohan et al. | 709/202 |
| 6,662,340 B2 * | 12/2003 | Rawat et al. | 715/236 |
| 6,704,873 B1 * | 3/2004 | Underwood | 726/12 |
| 6,944,669 B1 * | 9/2005 | Saccocio | 709/229 |
| 7,013,329 B1 * | 3/2006 | Paul et al. | 709/217 |
| 7,254,569 B2 * | 8/2007 | Goodman et al. | 1/1 |
| 7,334,184 B1 * | 2/2008 | Simons | 715/234 |
| 7,689,899 B2 * | 3/2010 | Leymaster et al. | 715/224 |
| 2002/0107755 A1 * | 8/2002 | Steed et al. | 705/26 |
| 2003/0028792 A1 * | 2/2003 | Plow et al. | 713/193 |
| 2003/0058277 A1 * | 3/2003 | Bowman-Amuah | 345/765 |
| 2003/0105760 A1 * | 6/2003 | Sini | 707/10 |
| 2003/0110443 A1 * | 6/2003 | Yankovich et al. | 715/501.1 |
| 2003/0135591 A1 * | 7/2003 | Chetuparambil et al. | 709/220 |
| 2005/0044014 A1 * | 2/2005 | Tilis et al. | 705/30 |
| 2005/0183003 A1 * | 8/2005 | Peri | 715/507 |
| 2005/0257134 A1 * | 11/2005 | Goodman et al. | 715/507 |
| 2006/0047847 A1 * | 3/2006 | Saccocio | 709/235 |
| 2006/0061806 A1 * | 3/2006 | King et al. | 358/1.15 |

OTHER PUBLICATIONS

Truong et al.,"Automatic Feedback for "Fill in the Gap" programming Exercises", 2005, ACM, pp. 117-126.*
Barton et al.,"Sensor-enhanced Mobile Web Clients: an XForms Approach", ACM, 2003, pp. 80-89.*
Manderson et al.,"Fill-in-the-Blank JCL: Why We Did It and How", ACM, 1989, pp. 247-252.*
Kaljuvee et al.,"Efficient Web Form Entry on PDSs", ACM, 2001, pp. 663-672.*
Novell, "Internet Identity Management:",Ashlin Weekly Update, Apr. 3, 1999, pp. 1-2.*
Datta et al.,"Proxy-Based Acceleration of Dynamically Generated Content on the World Wide We: An Apporach and Implementation", ACM, 2004, pp. 403-443.*
Jammalamadaka et al.,Pvault: A Client Server System Providing Mobile Access to Personal Data, ACM, 2005, pp. 123-129.*

\* cited by examiner

*Primary Examiner* — Laurie Ries
(74) *Attorney, Agent, or Firm* — Schwegman, Lundberg & Woessner, P.A.

(57) ABSTRACT

An embodiment includes a method that includes intercepting, by an intermediary, a form destined for a device used by a user over a network that is from an application executing on a different device on the network. The form includes parts to be completed by the user. The method also includes completing, by the intermediary, a first part of the parts to be completed by the user, prior to the form being received by the device.

33 Claims, 5 Drawing Sheets

ACQUISITION OF USER DATA OVER A NETWORK

TECHNICAL FIELD

The application relates generally to data processing, and, more particularly, to acquisition of user data over a network.

BACKGROUND

The amount of data traffic over large networks, such as the Internet, continues to increase. Such increase is the result of continued exponential increases in the number of users, as well as in the number of large documents, such as media files, to which these users desire access. As a result of this unprecedented demand in the need for bandwidth and access to networks, Internet Service Providers (ISPs), backbone providers, and other carriers that provide the physical connections which implement the Internet face correspondingly unprecedented difficulty.

Moreover, the number of applications requesting data from users continues to increase. For example, users are making purchases over the Internet. Applications of web sites from which such purchases are being made request data from the users making such purchases (e.g., name, address, date of birth, email address, credit card numbers, etc.). The users are requested to enter data into a form transmitted thereto.

Furthermore, the number of users that are using constrained information devices, such as mobile devices (e.g., cellular telephones, Personal Digital Assistants (PDAs), etc.) during these transactions continues to increase. Specifically, these constrained information devices typically have limited data storage, screen space, bandwidth, etc.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

SUMMARY

Methods, apparatus and systems for acquiring user data over a network are described. Some embodiments include a method that includes intercepting, by an intermediary, a form destined for a device used by a user over a network that is from an application executing on a different device on the network. The form includes parts to be completed by the user. The method also includes completing, by the intermediary, a first part of the parts to be completed by the user, prior to the form being received by the device.

In some embodiments, a method includes receiving a form being transmitted to a device of a user over a network prior to the form being received by the device. The form includes parts that are to be completed by the user. A data query is generated based on the parts that are to be completed by the user. The method also includes querying, using the data query, a database that includes a profile of the user. The method includes receiving at least one answer to at least part of the data query. The method includes completing at least one part of the parts that are to be completed by the user to generate a non-user completed part of the form. A form fragment is generated that does not include at least one part completed. The form fragment is forwarded to the device of the user. The method also includes receiving back from the device, in response to the forwarding, a document fragment that includes a result of the user completing the form fragment. The method includes merging the non-user completed part of the form with the result of the user completing the form fragment to generate a completed document. The method also includes returning the completed document over the network to an application that transmitted the form.

DETAILED DESCRIPTION

Methods, apparatus and systems for acquiring user data over a network are described. In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
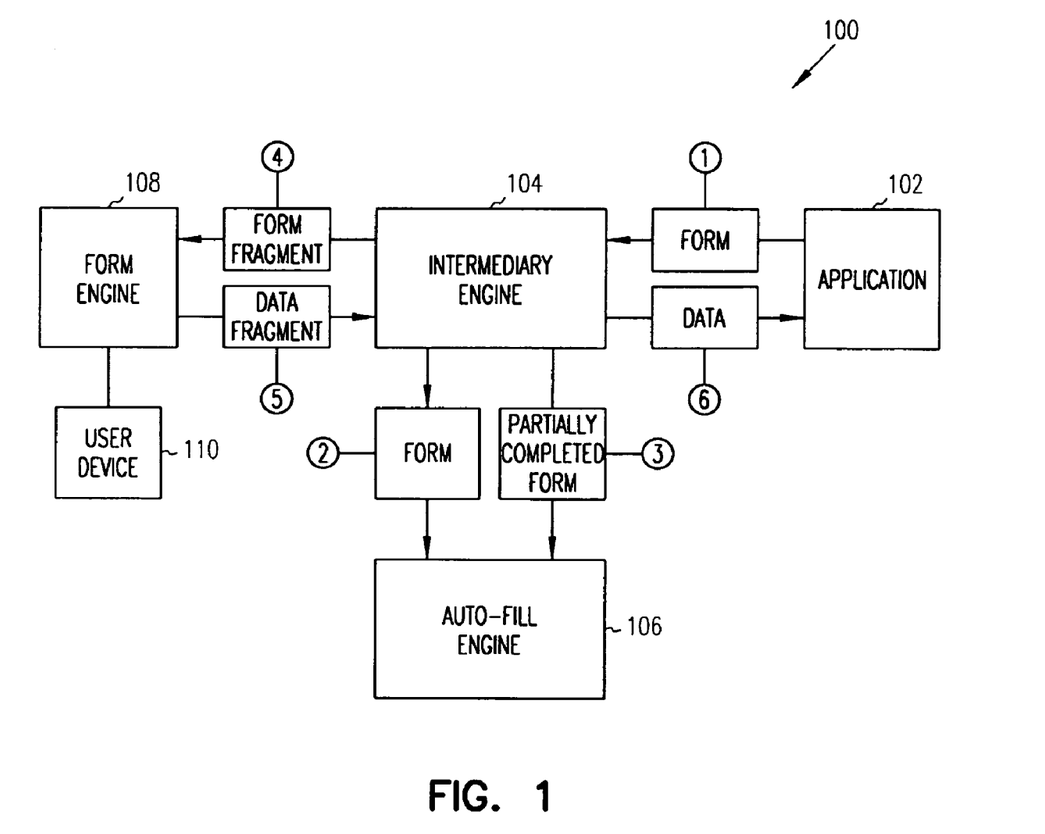
FIG. 1 is a dataflow diagram for acquiring user data over a network, according to some embodiments of the invention.

FIG. 1 is a dataflow diagram for acquiring user data over a network, according to some embodiments of the invention. For example, a web application may acquire data from users over the Internet as part of different transactions (e.g., purchases). FIG. 1 includes a system 100 that includes an application 102, an intermediary engine 104, an auto-fill engine 106, a form engine 108 and a user device 110. The application 102, the intermediary engine 104, the query engine 104 and the form engine 108 may be software, hardware, firmware or a combination thereof. The application 102, the intermediary engine 104, the auto-fill engine 106 and the form engine 108 may be on the same server, all on different servers, more than one on the same server, etc. For example, in some embodiments, the intermediary engine 104, the auto-fill engine 106 and the form engine 108 may be executing on a same server, while the application 102 is executing on a different server.

At stage 1, the application 102 transmits a form that is destined for the user device 110. The form may represent an information request made to a user. For example, the form may be an HyperText Markup Language (HTML) form that includes parts to be completed by the user. For example, the form may include queries for the name, address, email address, credit card number, etc. of the user. As shown, the intermediary engine 104 may intercept the form. For example, the application 102 may be executing on an application server, and the intermediary engine 104 may be executing on a proxy server (such as a cache server). In some embodiments, the application 102 may be configured to transmit the forms for different users to the intermediary engine 104.

At stage 2, the intermediary engine 104 may transmit the form to the auto-fill engine 106. The auto-fill engine 106 may complete at least a part of the query for user data. The auto-fill engine 106 may access a database of user data (not shown) to complete at least a part of the query. For example, the auto-fill engine 106 may store names, addresses, etc. of users. The application 102 may securely store such data therein.

At stage 3, the auto-fill engine 106 may transmit the partially completed form to the intermediary engine 104. The partially completed form may have at least of a part of the query for user data completed. The intermediary engine 104 generates a new form. The new form may be a form fragment. In particular, the new form may include a query of user data that includes a query of user data that is less than the form transmitted by the application 102. The form fragment may include only those parts of the query that were not completed by the auto-fill engine 106. For example, the original form may include a query for the name, address and credit card number of the user. If the auto-fill engine 106 completes a query for the name and address of the user, the form fragment may only include a query of the credit card number.

At stage 4, the intermediary engine 104 transmits the form fragment to the form engine 108. The form engine 108 transmits the form fragment to the user device 110. The user of the user device 110 may complete and transmit the query for user data in the form fragment back to the form engine 108.

At stage 5, the form engine 108 transmits the data fragment or document fragment (that includes the user data that was requested) back to the intermediary engine 104. The intermediary engine 104 may merge the data fragment with the user data completed by the auto-fill engine 106.

At stage 6, the intermediary engine 104 transmits the merged data back to the application 102. As further described below, the intermediary engine 104 may intercept queries for data from a number of different users for any of a number of different applications. Some embodiments may be used in conjunction with user devices that are constrained (e.g., limited data storage, screen space, bandwidth, etc.). Accordingly, such devices may only have to receive and process data queries that are less that the original data query. These fragmented data requests may take consume less bandwidth and occupy less screen space, data storage and processing power.

Moreover, some embodiments may be configured to limit what data queries that the user may answer. Specifically, the user may be limited because of security and accuracy concerns. In an application, some embodiments may allow an organization to set certain information usage and creation policies, which may be enforced by the intermediary engine 104. In an example where the user is an employee, the organization may not allow the user to fill in the user's organizational role therein. Rather, this data would be from a human resource application that may be part of the auto-fill engine 106.

As described, some embodiments include an intermediary that does not execute in the user device (the client side). Moreover, some embodiments do not execute as part of the application requesting the user information (the server side for the application). Accordingly, some embodiments may be used across different users and for multiple applications.

Moreover, in contrast to conventional approaches, some embodiments use annotations for the forms to allow for a more precise determination of the data query for the user information. Specifically, a first application may mark one type of field (such as an email address) differently than a second application. Therefore, conventional approaches on the client side that guess at the completion of such fields may not be as precise as some embodiments. As further described below, the intermediary may be part of a cache server that may reside between the server executing the application and the user device.

Figure 2:
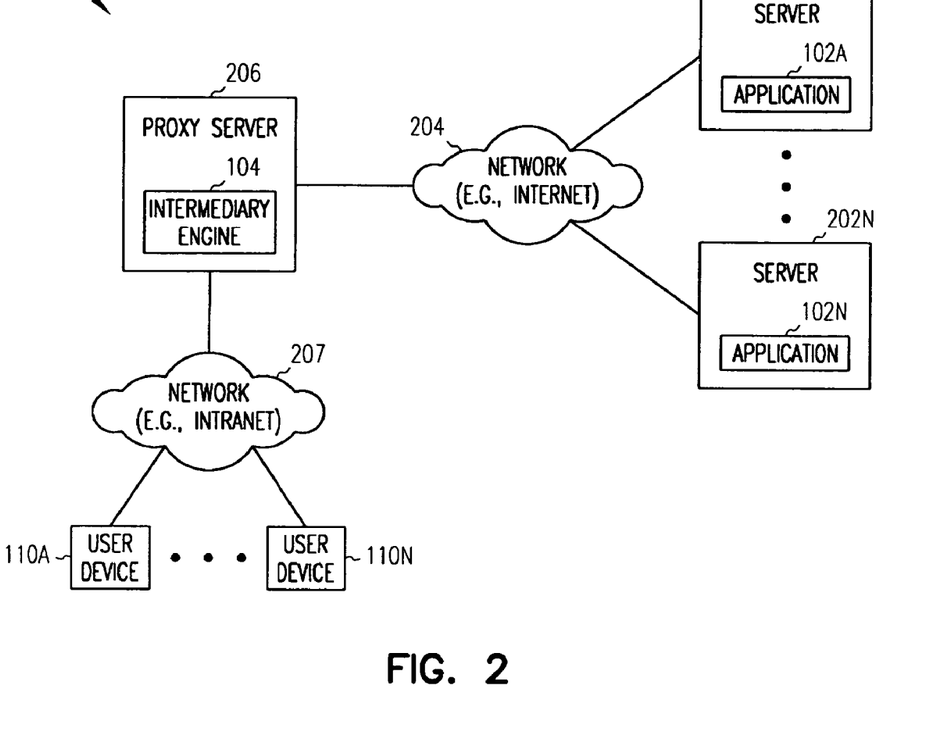
FIG. 2 is a block diagram of a system for acquiring user data over a network, according to some embodiments of the invention.

FIG. 2 is a block diagram of a system for acquiring user data over a network, according to some embodiments of the invention. As shown in FIG. 2, a system 200 includes servers 202A-202N, a proxy server 206 and user devices 110A-110N. The servers 202A-202N are coupled to the proxy server 206 through a network 204. The proxy server 206 is coupled to the user devices 110A-110N through a network 207.

The networks 204 and 207 may include a Local Area Network (LAN), a Wide Area Networks (WAN), a telephone network, such as the Public Switched Telephone Network (PSTN), an intranet, the Internet, or a combination of networks. In some embodiments, the network 207 may be an intranet (such as a LAN). For example, the network 207 may be part of a corporate LAN which provide a gateway to the network 204, which may be a WAN (e.g., the Internet). Although FIG. 2 illustrates a set number of servers 202A-202N, the proxy server 206 and the user devices 110A-110N, the system 200 may include a lesser or greater number of such components. The servers 202A-202N include the applications 102A-102N, respectively. The proxy server 206 includes the intermediary engine 104. Although not shown, the proxy server 206 may also include the auto-fill engine 106 and the form engine 108. In some embodiments, the proxy server 206 may be a cache server for the user devices 110A-110N.

Figure 3:
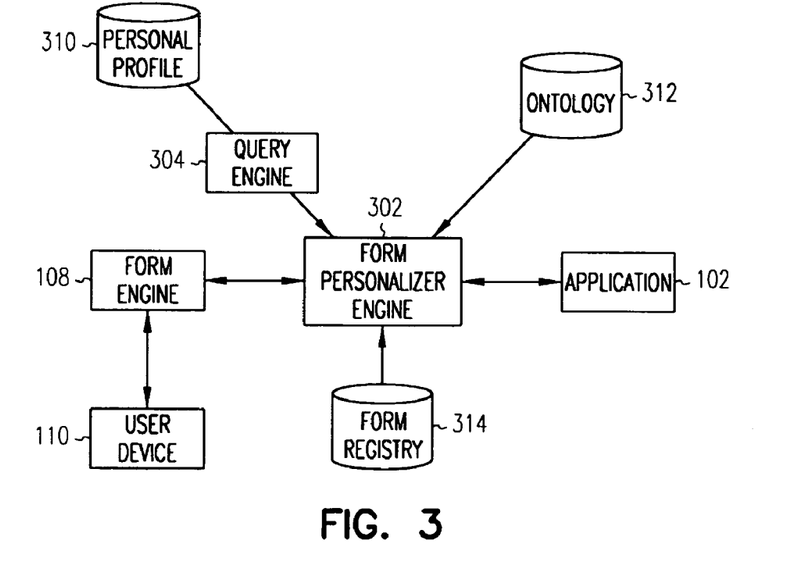
FIG. 3 is a more detailed block diagram of an intermediary engine and associated data stores for acquiring user data over a network, according to some embodiments of the invention.

FIG. 3 is a more detailed block diagram of an intermediary engine and associated data stores for acquiring user data over a network, according to some embodiments of the invention. In particular, FIG. 3 illustrates a query engine 304, a form personalizer engine 302 and a form engine 108. The query engine 304, the form personalizer engine 302 and the form engine 108 may be part of a same logic unit or may be separate logic units. With reference to FIG. 1, the query engine 304 and the form personalizer engine 302 may be representative of a more detailed block diagram of the intermediary engine 104 and the auto-fill engine 106.

The form personalizer engine 302 is coupled to the application 102. The form engine 306 is coupled to the user device 110. The form personalizer engine 302 is coupled to the query engine 304 and the form engine 306. The form personalizer engine 302 is coupled to access the form registry data store 314 and the ontology data store 312. The query engine 304 is coupled to access the personal profile data store 310.

The personal profile data store 310, the ontology data store 312 and the form registry data store 314 may be different types of machine-readable medium. For example, the data stores may be volatile and/or non-volatile media (e.g., read only memory (ROM), random access memory (RAM), magnetic disk storage media, optical storage media, flash memory devices, etc.). The personal profile data store 310 may store data related to different users of the applications 102. For example, the data may store user attributes, preferences, past behavior, etc. The ontology data store 312 may store data related to ontologies (or conceptual data models) relevant to the domain of the applications 102. The ontologies are explicit specifications of a conceptualization. The ontologies may be expressed using different languages (such as the Web Ontology Language (OWL), Resource Description Framework Schema (RDFS)). The form registry data store 314 may store data related to semantic annotations of the forms (being transmitted to the users) according to the known ontologies in the ontology data store 312. Different forms generated by the applications 102 may be based on different ontologies. As further described below, the ontologies of the forms are used to generate the annotations.

Figure 4:
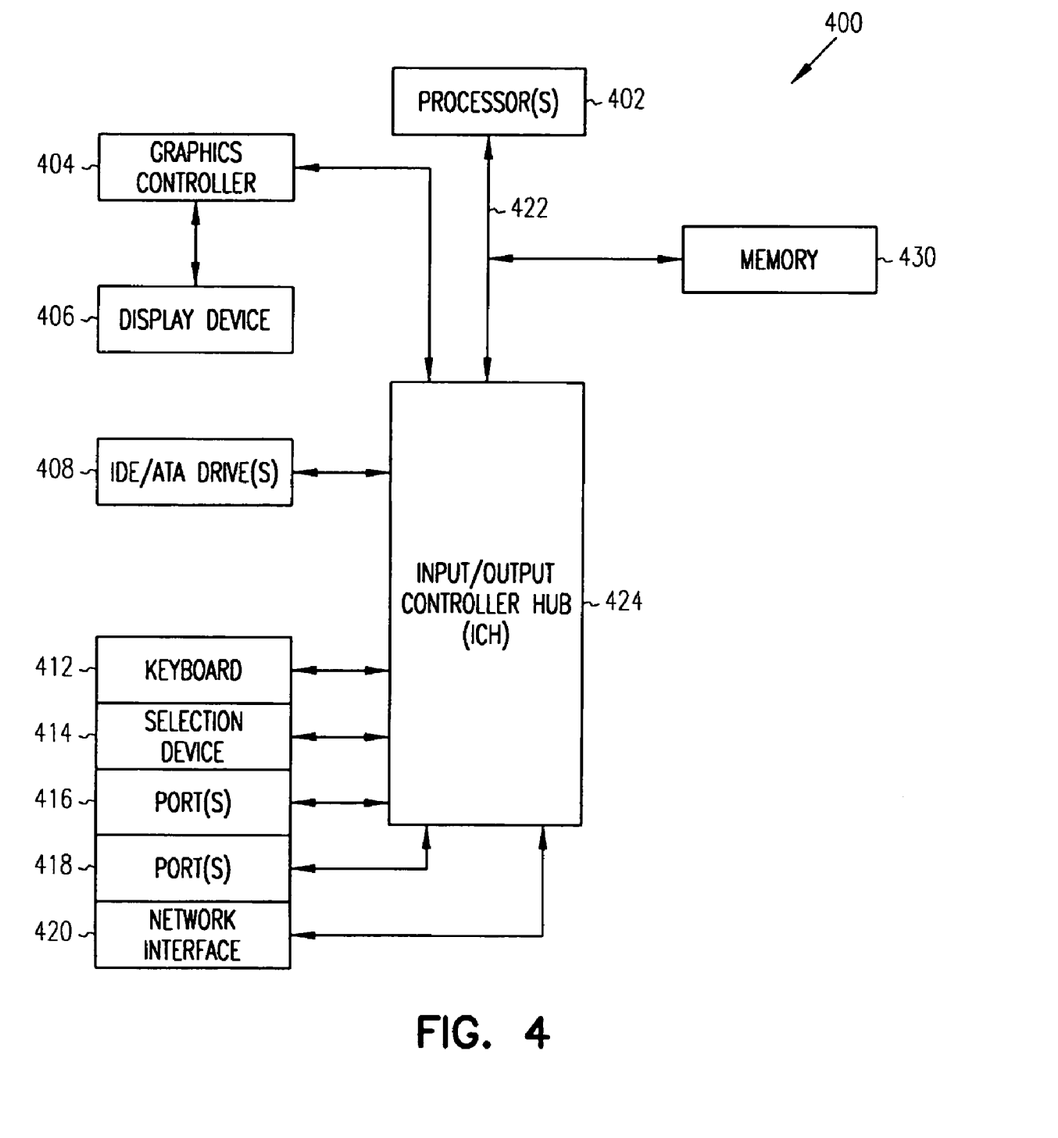
FIG. 4 illustrates a computer device that executes software for performing operations related to acquiring user data over a network, according to some embodiments of the invention.

An embodiment wherein software performs operations related to acquiring user data over a network as described herein is now described. In particular, FIG. 4 illustrates a computer device that executes software for performing operations related to acquiring user data over a network, according to some embodiments of the invention. FIG. 4 illustrates a computer device 400 that may be representative of at least part of the configuration of the servers 202A-202N, the proxy server 206 and/or the user devices 110A-110N.

As illustrated in FIG. 4, a computer device 400 comprises processor(s) 402. The computer device 400 also includes a memory 430, a processor bus 422, and an input/output controller hub (ICH) 424. The processor(s) 402, the memory 430, and the ICH 442 are coupled to the processor bus 422. The processor(s) 402 may comprise any suitable processor architecture. The computer device 400 may comprise one, two, three, or more processors, any of which may execute a set of instructions in accordance with some embodiments of the invention.

The memory 430 stores data and/or instructions, and may comprise any suitable memory, such as a random access memory (RAM). For example, the memory 430 may be a Static RAM (SRAM), a Synchronous Dynamic RAM (SDRAM), DRAM, a double data rate (DDR) Synchronous Dynamic RAM (SDRAM), etc. A graphics controller 404 controls the display of information on a display device 406, according to an embodiment of the invention.

The ICH 424 provides an interface to Input/Output (I/O) devices or peripheral components for the computer device 400. The ICH 424 may comprise any suitable interface controller to provide for any suitable communication link to the processor(s) 402, the memory 430 and/or to any suitable device or component in communication with the ICH 424. For an embodiment of the invention, the ICH 424 provides suitable arbitration and buffering for each interface.

In an embodiment, the ICH 424 provides an interface to one or more suitable Integrated Drive Electronics (IDE)/Advanced Technology Attachment (ATA) drive(s) 408, such as a hard disk drive (HDD). In an embodiment, the ICH 424 also provides an interface to a keyboard 412, a mouse 414, one or more suitable devices through ports 416-418 (such as parallel ports, serial ports, Universal Serial Bus (USB), Firewire ports, etc.). In some embodiments, the ICH 424 also provides a network interface 420 though which the computer device 400 may communicate with other computers and/or devices.

With reference to the proxy server 206, the memory 430 and/or one of the IDE/ATA drives 408 may store the form registry data store 314, the ontology data store 312 and the personal profile data store 310. In some embodiments, the form personalizer engine 302, the query engine 304 and the form engine 306 may be instructions executing within the processor(s) 402. Therefore, the form personalizer engine 302, the query engine 304 and the form engine 306 may be stored in a machine-readable medium that are a set of instructions (e.g., software) embodying any one, or all, of the methodologies described herein. For example, the form personalizer engine 302, the query engine 304 and the form engine 306 may reside, completely or at least partially, within the memory 430, the processor(s) 402, one of the IDE/ATA drive(s) 408, etc.

This section provides a description of operations related to acquiring user data over a network, according to some embodiments of the invention. In some embodiments, the operations may be performed by instructions residing on machine-readable media (e.g., software), by hardware, firmware, or a combination thereof.

Figure 5:
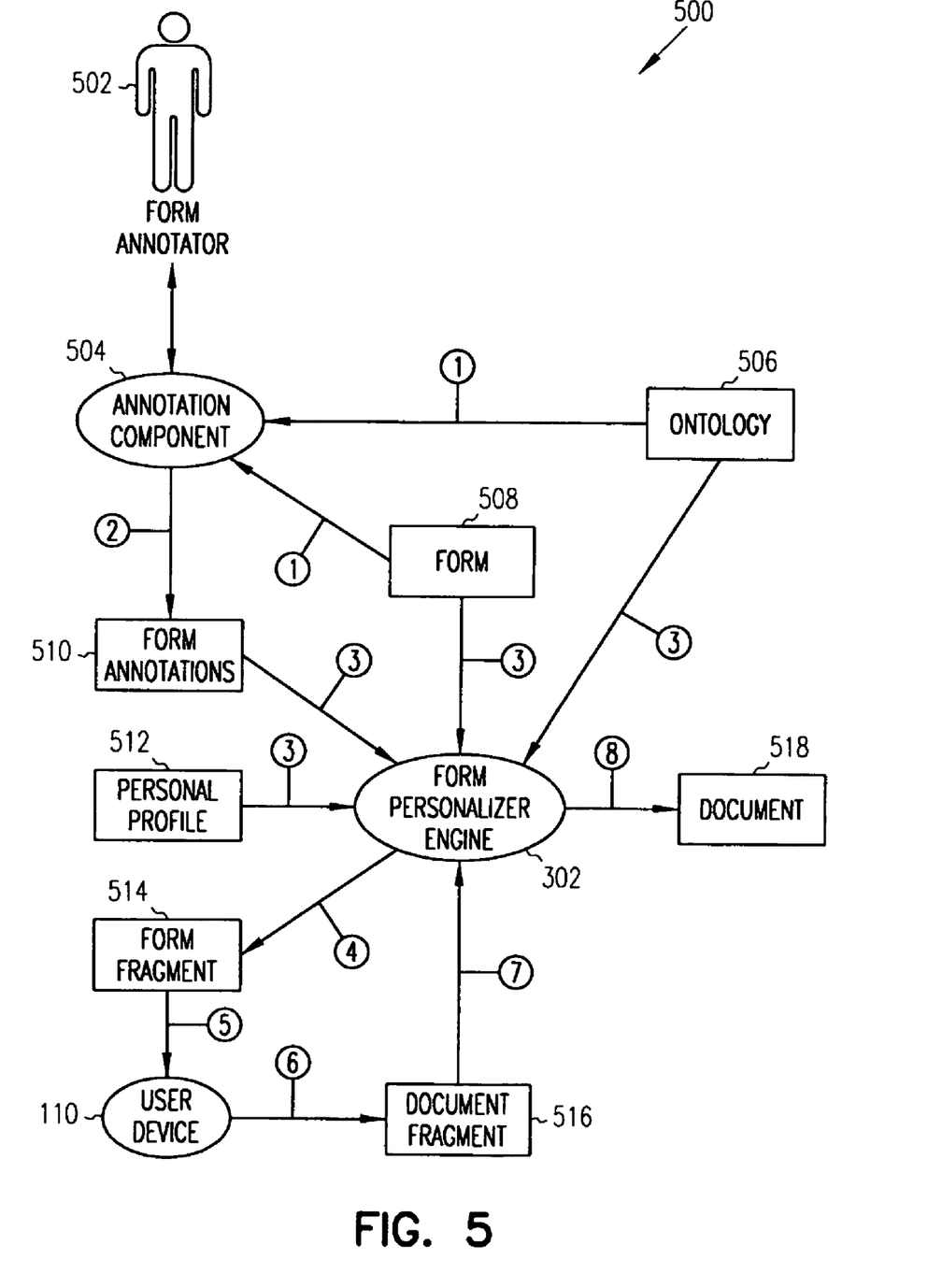
FIG. 5 illustrates a system data flow diagram for acquiring user data over a network, according to some embodiments of the invention.

FIG. 5 illustrates a system data flow diagram for acquiring user data over a network, according to some embodiments of the invention. FIG. 5 illustrates a system 500 that includes the form personalizer engine 302, the user device 110 and a form annotator 502. The system 500 illustrates multiple data flows that relate to two different operations. In particular, a first operation relates to the generation and storage of form annotations 510 for a form 508 (a data flow 1 and a data flow 2). A second operation relates to the using of the form annotations 510 to acquire user data requested by the form 508.

For the first operation, the form annotator 502 may generate some form annotations 510 for a form 508 using the annotation component 504. At a data flow 1, an ontology 506 and the form 508 may be input and used by the annotation component 504 to generate the form annotations 510. The form 508 may be an X-form, HyperText Markup Language (HTML) form, etc.

In some embodiments, the form annotator 502 may be a person that reviews the form 508 and the ontology 506 for the form 508 to generate the form annotations 510 for the form 508. In some embodiments, the form annotator 502 may be the person that designed the form 508. The form annotations 510 may include annotations that are mark ups of the fields in the forms that provide semantic or meaning to the fields. In particular, the form annotator 502 may annotate the form 508 in accordance with the ontology or document schema that the form personalizer engine 302 may interpret. Examples of annotations may include indications of which fields are requests for different user data (e.g., the user's home address, phone number, credit card number, etc.).

In some embodiments, the form annotations 510 may be generated independent of the form annotator 502. For example, the form annotations 510 may be generated based on processing by an application (not shown). Such application may receive the ontology 506 and the form 508 as input and may output the form annotations 510.

At a data flow 2, the annotation component 504 may store the annotations into the form annotations 510. In some embodiments, the form annotations 510 may be stored in the form registry data store 314 (shown in FIG. 3).

The system 500 illustrates the annotations for one form (the form 508). Some embodiments are not so limited. Specifically, some embodiments include form annotations for different forms that may be for one of more applications. Moreover, the different forms may be based on the same or different ontologies. Therefore, the form annotator 502 may map different ontologies for different forms into an ontology that the form personalizer engine 302 may interpret.

The second operation may commence after a form is received by the form personalizer engine 302 from an application 102. For the second operation, the form personalizer engine 302 may determine that at least part of the user data being requested (queried for) may be retrieved from a personal profile for the user stored in the personal profile data store 512. In some embodiments, the form personalizer engine 302 may use the form, the annotations for the form and the personal profile for the user to make this determination. Accordingly, at data flow 3, the form 508, the form annotations 510 and the personal profile 512 are inputted into the form personalizer engine 302.

As described above, the form may conceptually represent an information request made to a user. In some embodiments, the form has been semantically annotated. Based on such annotations, the form personalizer engine 302 may generate a data query. Depending on the format of how the data is stored in the personal profile data store 310, the formal data query may be a Structured Query Language (SQL) query, extensible markup language (XML) query, a Resource Description Framework (RDF) Query Language (RDQL) query, etc.

The form personalizer engine 302 may transmit this data query to the query engine 304 (shown in FIG. 3) which may access the personal profile for the user from the personal profile data store 310. Accordingly, as part of a data flow 3, the form personalizer engine 302 may receive the form 508 and the form annotations 510 and generate a data query therefrom. Also as part of the data flow 3, the form personalizer engine 302 may receive the result of the data query back from the query 304 (shown as input from the personal profile 512). Additionally, as part of the data flow 3, the form personalizer engine 302 may receive the ontology 506. The use of the ontology 506 by the form personalizer engine 302 is described in more detail below.

The form personalizer engine 302 may answer at least a part of the data query based on the query 304. In some embodiments, the form personalizer engine 302 may answer the entire data query. At a data flow 4, the form personalizer engine 302 may generate a form fragment 514. The form fragment may be a new form that excludes the answers on the form completed based on the query 304.

At a data flow 5, the form fragment 514 is transmitted to the user device 110. In some embodiments, the form fragment 514 may include an indication that an intermediary has completed a part of the form. In some embodiments, the user may be given the option to download the completed part of the form for review. Alternatively or in addition, the form fragment 514 may include the completed part of the form for review. The completed part of the form may or may not be initially viewable by the user. For example, the completed part of the form may be initially hidden from the user. The user may subsequently select an icon to view the completed part.

In some embodiments, the user may be allowed to edit the completed part of the form. In other embodiments, the user may be allowed to review but not edit. For example, in a web application wherein the completed part of the form may include the address of the user, the user may be allowed to review and edit. However, in some embodiments, corporate control may be needed to allow for the review but not editing of given parts of a form. For example, a corporate web application may allow the user to review (but not edit) their title when ordering business cards using a given application.

At a data flow 6, the user of the user device 110 may complete the answers on the form fragment 514. The result of such answers is a document fragment 516. At a data flow 7, the user device 516 may transmit the document fragment 516 back to the form personalizer engine 302.

At a data flow 8, the form personalizer engine 302 may merge the completed part of the form based on the personal profile with the answers in the document fragment 516 to generate a document 518. In some embodiments, the form personalizer engine 302 may use the ontology 506 to use the correct document schema for generating the document 518. In particular, the application 102 may expect the document having the answers on the form to be in a given format. The form personalizer engine 302 may, therefore, use the ontology 506 for the form to generate the correct format for the document 518. The formal personalizer engine 302 may transmit the document 518 back to the application 102.

Figure 6:
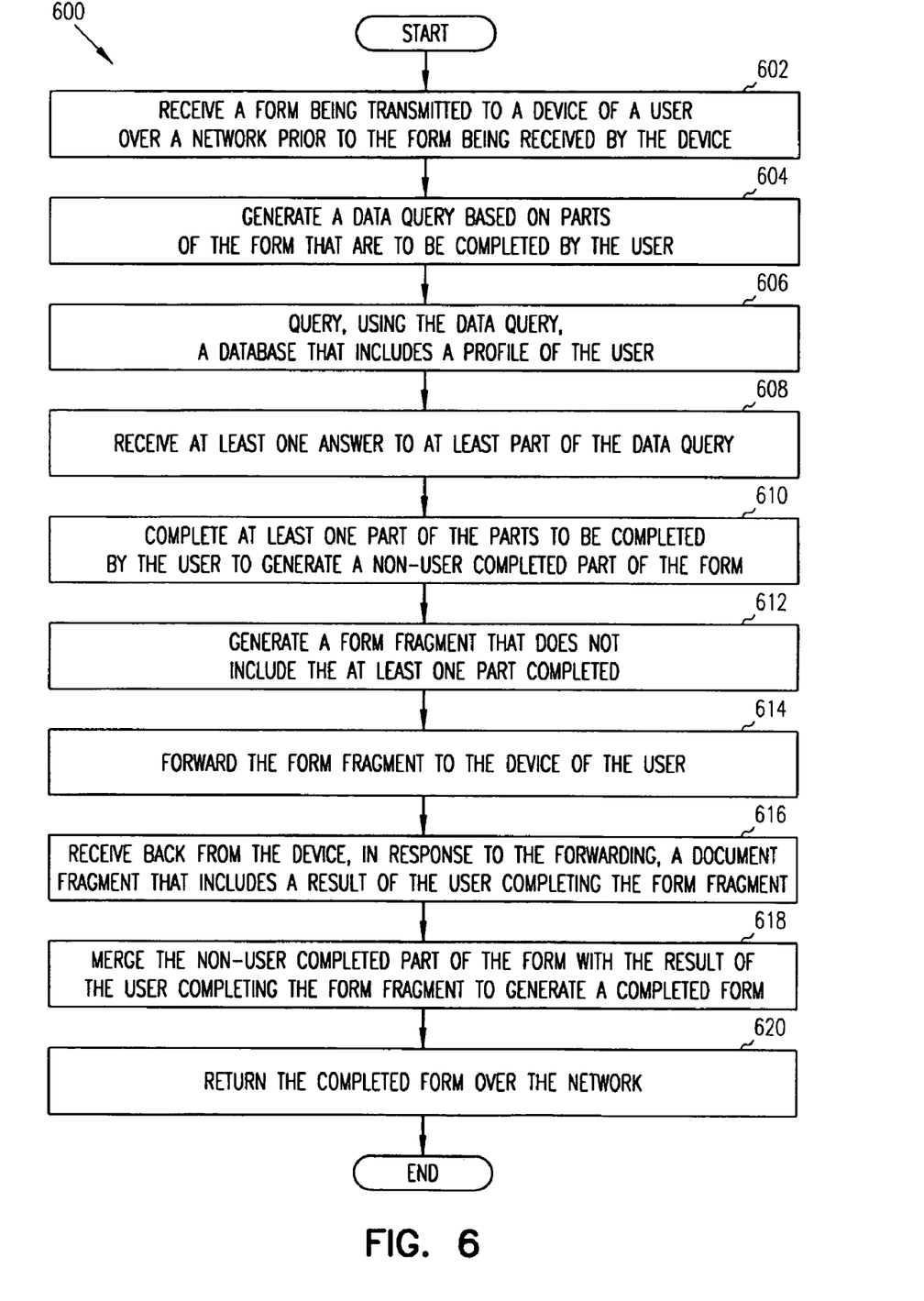
FIG. 6 illustrates a flow diagram of operations for acquiring user data over a network, according to some embodiments of the invention.

FIG. 6 illustrates a flow diagram of operations for acquiring user data over a network, according to some embodiments of the invention. The flow diagram 600 is described with reference to FIGS. 1-5. The flow diagram 600 commences at block 602.

At block 602, the form personalizer engine 302 receives a form being transmitted to the user device 110 over the network 204 from the application 102 prior to the form being received by the user device 110. The form includes parts that are to be completed by the user. Specifically, the form may represent an information request made to the user of the user device 110. The flow continues at block 604.

At block 604, the form personalizer engine 302 generates a data query based on the parts that are to be completed by the user. With reference to FIG. 5, the form personalizer engine 302 may generate the data query based on the form annotations 510, the form 508 and the ontology 506. In particular, the form annotations 510 and the form 508 are those that are associated with the form transmitted by the application 102. The form annotations 510 may include mark ups of the form 508 that indicate the type of user data that is being requested by the form 508. Accordingly, the form personalizer engine 302 may generate the data query based on the type of user data being requested by the form (home address, email address, name, etc.). The flow continues at block 606.

At block 606, the query engine 304 queries, using the data query, the personal profile data store 310 that includes a profile of the user. The personal profile data store 310 may store profiles of user data for any of a number of users. A number of different applications 102 may have user profiles based on prior transactions with the users. Accordingly, the number of different applications 102 may transmit the user profiles to the proxy server 206 for storage therein. In some embodiments, the user profiles may be cached as cache data into the proxy server 206 from the servers 102. The flow continues at block 608.

At block 608, the form personalizer engine 302 may receive at least one answer to at least part of the data query. In particular, the query engine 304 may return a result that answers a part of the data query. Such result may be returned to the form personalizer engine 302. The flow continues at block 610.

At block 610, the form personalizer engine 302 completes at least one part of the parts that are to be completed by the user to generate a non-user completed part of the form. The form personalizer engine 302 may store this non-user completed part of the form. The flow continues at block 612.

At block 612, the form personalizer engine 302 generates a form fragment that does not include the at least one part completed based on the data query. For example, the form may have requested the user's name, home address, email address and credit card number. The personal profile data store 310 may include the user's name, home address and email address. Accordingly, the form fragment may only include a request for the user to enter a credit card number. The flow continues at block 614.

At block 614, the form personalizer engine 302 forwards the form fragment to the user device 110. As described above, in some embodiments, the form personalizer engine 302 may also forward an indication that part of the request for user data was completed by the form personalizer engine 302. The form personalizer engine 302 may also include the part completed by the data query. Accordingly, the user may view and/or edit the part completed by the form personalizer engine 302. The flow continues at block 616.

At block 616, the form personalizer engine 302 receives back from the user device 110 (in response to the forwarding) a document fragment that includes a result of the user completing the form fragment. The document fragment may be formatted in accordance with the format that the application 102 is expecting. In particular, the application 102 may expect the answers to the request for user data in the form to be according to a given format. The flow continues at block 618.

At block 618, the form personalizer engine 302 merges the non-user completed part of the form with the document fragment (the result of the user completing the form fragment) to generate a completed document. The completed document may be formatted according to the format expected by the application 102. The flow continues at block 620.

At block 620, the form personalizer engine 302 returns the completed form over the network 204 to the application 102 that transmitted the form. The operations of the flow diagram 600 are complete.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for acquiring user data over a network, in accordance with some embodiments of the invention. A number of flow diagrams illustrate the operations for acquiring user data over a network, in accordance with some embodiments of the invention. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method including:
   intercepting, by an intermediary, a form destined for a device used by a user over a network, the form being from an application executing on an application server, the application server being a different device on the network from both the intermediary and the device used by the user, the form including parts to be completed by the user; and
   completing, by the intermediary, a first part of the parts to be completed by the user, prior to the form being received by the device used by the user, the first part of the parts that has been completed by the intermediary is not forwarded to the device used by the user.

2. The method of claim 1, further including forwarding, by the intermediary, to the device used by the user a second part of the parts to be completed by the user that has not been completed by the intermediary.

3. The method of claim 2, wherein forwarding to the device used by the user the second part of the parts to be completed by the user that have not been completed by the intermediary comprises forwarding non-confidential data to the device used by the user.

4. The method of claim 2, further including receiving, by the intermediary, back from the device used by the user, in response to the forwarding operation, an answer to the parts to be completed by the user.

5. The method of claim 4, further including merging, by the intermediary, the first part and the answer from the device used by the user.

6. The method of claim 1, further including forwarding, by the intermediary, to the device used by the user the parts to be completed by the user.

7. The method of claim 6, wherein the first part of the parts that has been completed by the intermediary is hidden and viewable by the user.

8. The method of claim 6, wherein the first part of the parts that has been completed by the intermediary is viewable and editable by the user.

9. The method of claim 6, wherein at least the first part that has been completed by the intermediary is viewable and not editable by the user.

10. The method of claim 1, wherein intercepting the form destined for the device used by the user comprises intercepting the form destined for a constrained information device.

11. The method of claim 10, wherein the constrained information device is from a group consisting of a mobile telephone, a personal digital assistant, and a non-mobile device.

12. A method including:
receiving, by a proxy server, a form being transmitted over a network from an application server to a device of a user prior to the form being received by the device of the user, the form including parts that are to be completed by the user, the application server being a different device on the network from the proxy server;
generating a data query based on the parts that are to be completed by the user;
querying, using the data query, a database that includes a profile of the user;
receiving at least one answer to at least part of the data query;
completing at least one part of the parts that are to be completed by the user to generate a non-user completed part of the form, the form being from an application executing on the application server, the application server being a different device on the network than a device completing the at least one part;
generating a form fragment that does not include the at least one part completed;
forwarding only the form fragment to the device of the user; and
receiving back from the device of the user, in response to the forwarding, a document fragment that includes a result of the user completing the form fragment.

13. The method of claim 12, wherein receiving the form comprises receiving more than one form from more than one application.

14. The method of claim 12, further including merging the non-user completed part of the form with the result of the user completing the form fragment to generate a completed document.

15. The method of claim 12, further including returning the completed document over the network to an application that transmitted the form.

16. The method of claim 15, wherein returning the completed document comprises returning the completed document in accordance with a document schema for the form.

17. The method of claim 12, further including forwarding to the device of the user the at least one part completed.

18. The method of claim 17, wherein the at least one part completed is hidden and viewable by the user.

19. The method of claim 17, wherein the at least one part completed is viewable and editable by the user.

20. The method of claim 17, wherein the at least one part completed is viewable and not editable by the user.

21. A system including:
a proxy server coupled over a network to a device of a user, the proxy server further coupled over the network to an application server to execute an application, the application server being a different device on the network from the proxy server and the device of the user, the proxy server to intercept a form being transmitted from the application server to the device of the user, the form including parts that are to be completed by the user, the proxy server including:
a data store to store an annotation of the form and a personal profile of the user; and
a form personalizer engine to generate a data query for the parts to be completed by the user based on the annotation of the form, the form personalizer engine to retrieve from the personal profile, using the data query, an answer to at least a portion of the parts to be completed by the user, the form personalizer engine is further to generate a form fragment that does not include the at least the portion, the form personalizer engine is further to forward only the form fragment to the device of the user.

22. The system of claim 21, wherein the form personalizer engine is to receive back from the device of the user, in response to the forwarding, a document fragment that includes a result of completion by the user of the form fragment.

23. The system of claim 22, wherein the document fragment does not include confidential data.

24. The system of claim 22, wherein the form personalizer engine is to merge the at least the portion and the document fragment to generate a merged document.

25. The system of claim 24, wherein the form personalizer engine is to forward the merged document to the application server.

26. The system of claim 21, wherein the form personalizer engine is not to forward the at least the portion to the device of the user.

27. An apparatus including:
means for intercepting, by an intermediary using one or more processors, a form destined for a device used by a user over a network that is from an application executing on an application server, the application server being a different device on the network from both the intermediary device and the device used by the user, the form to include parts to be completed by the user; and
means for completing, by the intermediary using the one or more processors, at least a portion of the parts to be completed by the user, prior to the form being received by the device used by the user, wherein the at least the portion that has been completed by means for completing is not forwarded to the device used by the user.

28. The apparatus of claim 27, further including means for forwarding, by the intermediary, to the device used by the user the parts to be completed by the user that have not been completed by the completing operation.

29. The apparatus of claim 28, wherein means for forwarding to the device used by the user the parts to be completed by the user that have not been completed by the completing operation comprises means for forwarding non-confidential data to the device used by the user.

30. The apparatus of claim 28, further including means for receiving, by the intermediary, back from the device used by the user, in response to the forwarding, an answer to the parts to be completed by the user.

31. The apparatus of claim 30, further including means for merging, by the intermediary, the at least the portion and the answer from the device used by the user.

32. A non-transitory machine-readable storage medium storing instructions which, when executed by a machine, cause the machine to perform a method, the method comprising:
intercepting, by an intermediary, a form destined for a device used by a user over a network, the form being from an application executing on an application server, the application server being a different device on the network from both the intermediary and the device used by the user, the form including parts to be completed by the user; and
completing, by the intermediary, a first part of the parts to be completed by the user, prior to the form being received by the device used by the user, the first part of the parts that has been completed by the intermediary is not forwarded to the device used by the user.

33. A non-transitory machine-readable storage medium storing instructions which, when executed by a machine, cause the machine to perform a method, the method comprising:
   receiving, by a proxy server, a form being transmitted over a network from an application server to a device of a user prior to the form being received by the device of the user, the form including parts that are to be completed by the user, the application server being a different device on the network from the proxy server;
   generating a data query based on the parts that are to be completed by the user;
   querying, using the data query, a database that includes a profile of the user;
   receiving at least one answer to at least part of the data query;
   completing at least one part of the parts that are to be completed by the user to generate a non-user completed part of the form, the form being from an application executing on the application server, the application server being a different device on the network than a device completing the at least one part;
   generating a form fragment that does not include the at least one part completed;
   forwarding only the form fragment to the device of the user; and
   receiving back from the device of the user, in response to the forwarding, a document fragment that includes a result of the user completing the form fragment.

* * * * *